United States Patent [19]
Nagase et al.

[11] Patent Number: 5,872,315
[45] Date of Patent: Feb. 16, 1999

[54] PRESSURE DETECTING APPARATUS

[75] Inventors: Kazuyoshi Nagase, Nukata-gun; Hironobu Baba, Obu; Masahito Imai, Chita; Yukihiko Tanizawa, Kariya, all of Japan

[73] Assignee: Denso Corporation, Kariya, Japan

[21] Appl. No.: 805,171

[22] Filed: Feb. 24, 1997

[30] Foreign Application Priority Data

Feb. 26, 1996 [JP] Japan ...................................... 8-38377

[51] Int. Cl.$^6$ .................................................. G01L 9/04
[52] U.S. Cl. ................................................................ 73/726
[58] Field of Search ............................. 73/715, 720, 723, 73/726, 754

[56] References Cited

U.S. PATENT DOCUMENTS

| | | |
|---|---|---|
| 3,922,705 | 11/1975 | Yerman .................................. 73/726 X |
| 4,274,423 | 6/1981 | Mizuno et al. ......................... 73/726 X |
| 4,498,070 | 2/1985 | Lirman .................................. 73/726 X |
| 4,507,170 | 3/1985 | Myhre . | |
| 4,712,430 | 12/1987 | Wareham .............................. 73/726 X |
| 4,813,286 | 3/1989 | Kant ........................................ 73/726 |
| 4,840,067 | 6/1989 | Nishida et al. . | |
| 4,986,861 | 1/1991 | Nishida et al. . | |
| 5,207,102 | 5/1993 | Takahashi et al. . | |
| 5,291,788 | 3/1994 | Oohata et al. ......................... 73/726 X |
| 5,310,610 | 5/1994 | Furubayashi et al. ................. 73/726 X |
| 5,483,834 | 1/1996 | Frick ....................................... 73/726 X |
| 5,583,296 | 12/1996 | Mokwa et al. ......................... 73/726 X |

FOREIGN PATENT DOCUMENTS

| | | |
|---|---|---|
| 53-62581 | 6/1978 | Japan . |
| 61-88121 | 5/1986 | Japan . |
| 62-73131 | 4/1987 | Japan . |
| 62-291533 | 12/1987 | Japan . |
| 63-16240 | 1/1988 | Japan . |
| 63-5232 | 1/1988 | Japan . |
| 63-196081 | 8/1988 | Japan . |
| 63-217671 | 9/1988 | Japan . |
| 1-211986 | 8/1989 | Japan . |
| 2-271234 | 11/1990 | Japan . |
| 3-28732 | 2/1991 | Japan . |
| 5-13782 | 1/1993 | Japan . |
| 5-73551 | 10/1993 | Japan . |

*Primary Examiner*—Ronald L. Biegel
*Assistant Examiner*—Jewel Thompson
*Attorney, Agent, or Firm*—Pillsbury Madison & Sutro LLP

[57] ABSTRACT

A pressure detecting apparatus includes a sensing body with a diaphragm to which pressure is applied and a strain gauge plate having a {100} silicon substrate and a glass base, which is bonded on the sensing body. A thin portion and through holes are formed in the silicon substrate so that the thin portion has a beam structure on which strain gauges are formed. When the pressure is applied, the resistances of the strain gauges change in a positive direction, while the resistances of the strain gauges change in a negative direction. Accordingly, the linearity of the output from the pressure detecting apparatus can be improved.

22 Claims, 8 Drawing Sheets

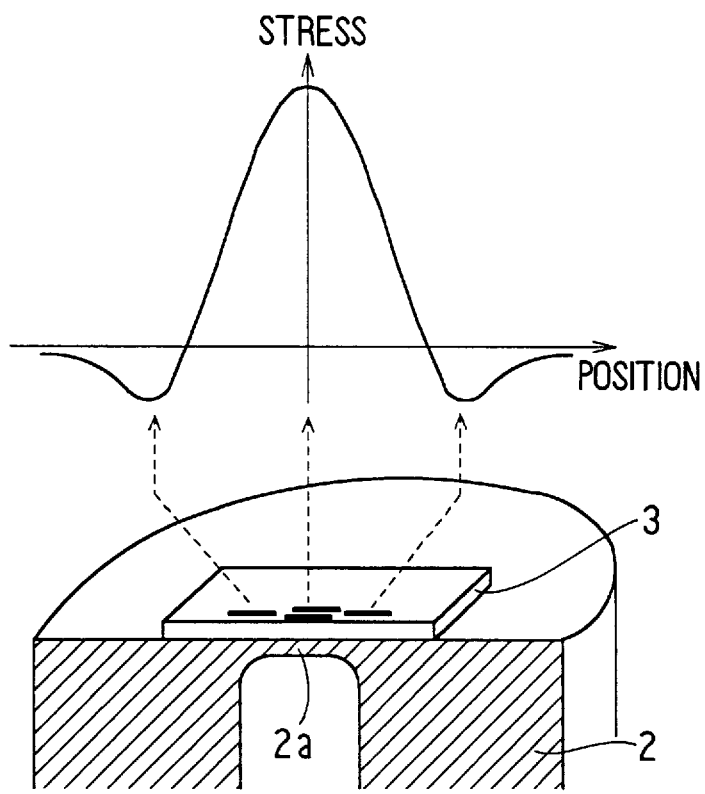
FIG. 15B PRIOR ART
FIG. 15A PRIOR ART
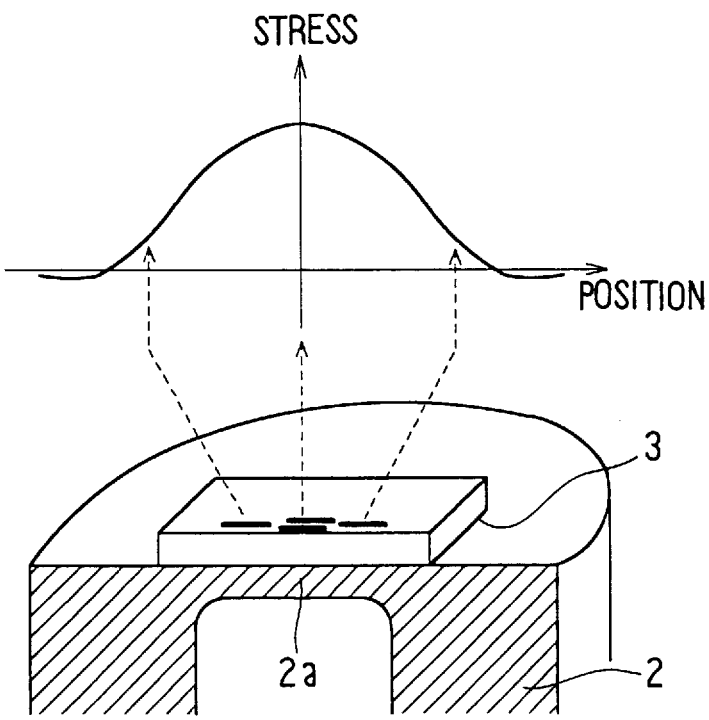
FIG. 15D PRIOR ART
FIG. 15C PRIOR ART

PRESSURE DETECTING APPARATUS

CROSS REFERENCE TO RELATED APPLICATION

This application is based upon and claims the benefit of priority of the prior Japanese Patent Application No. 8-38377 filed on Feb. 26, 1996, the contents of which are incorporated herein by reference.

BACKGROUND OF THE INVENTION

Field of the Invention

The present invention relates to a pressure detecting apparatus capable of detecting pressure of high pressure fluid or the like.

Related Arts

JP-B2-7-11461 proposes a pressure detecting apparatus for detecting pressure of high pressure fluid. The pressure detecting apparatus includes a sensing body having a metallic diaphragm and a strain gauge plate laminated on the sensing body through a glass layer. The strain gauge plate has a {110} silicon substrate. Semiconductor strain gauges (diffusion gauges) are formed on the surface of the silicon substrate.

The inventors of the present invention studied and experimented generation of stress in the above-mentioned pressure detecting apparatus.

As shown in FIG. 15A, a strain gauge plate 3 is bonded through a glass layer on a diaphragm 2a of a sensing body 2, and on the strain gauge plate 3 are formed four strain gauges indicated by black bold lines in the figure. When pressure is applied to the diaphragm 2a, as shown in FIG. 15B, tensile stress occurs at the center of the strain gauge plate 3 and compressive stress occurs at the periphery thereof. The resistance of each strain gauge changes in response to the magnitude of the tensile stress or the compressive stress.

The strain gauges form a bridge circuit, from which a signal is output in response to changes in the resistances of the strain gauges. If the magnitude of the tensile stress is equal to the magnitude of the compressive stress, the output characteristics of the bridge circuit have linearity with respect to the changes in the resistances of the strain gauges.

In the pressure detecting apparatus shown in FIGS. 15A and 15B, however, because the absolute value of the tensile stress at the center of the strain gauge plate 3 is larger than that of the compressive stress at the periphery thereof, the output characteristics of the bridge circuit indicate non-linearity.

The tendency of non-linearity of the output characteristics becomes more outstanding when the strain gauge plate 3 becomes thick, the diaphragm 2 becomes thick, or the diameter of the diaphragm 2 becomes large. In these cases, the compressive stress becomes small compared with the tensile stress as shown in FIGS. 15c and 15D.

To realize the linearity of the output characteristics in the constitution shown in FIGS. 15A and 15C, it is necessary that the strain gauge plate 3 and the diaphragm 2a are as thin as possible. On the other hand, the strain gauge plate 3 and the diaphragm 2a need to have a certain thickness, respectively. Therefore, it is not effective to thin the strain gauge plate 3 and the diaphragm 2a.

Further, in the pressure detecting apparatus having the constitution shown in FIGS. 15A and 15C, thermal stress generates on the basis of a difference in thermal expansion coefficient between the sensing body 2 and the strain gauge plate 3 to affect sensitivity of the pressure detecting apparatus. Even if the materials of the sensing body 2 and the strain gauge plate 3 are chosen to minimize the difference in the thermal expansion coefficient therebetween, it is impossible to eliminate the difference in the thermal expansion coefficient. Therefore, the strain gauge plate 3 is thinned so that the adverse effect of the thermal stress becomes small and the sensitivity thereof is improved. Because it is, however, impossible to thin the strain gauge plate 3 to a desired thickness, the adverse effect of the thermal stress can not be eliminated completely.

SUMMARY OF THE INVENTION

The present invention has been made in view of the above-mentioned problems and an object of the present invention is to provide a pressure detecting apparatus having enough linearity of the output characteristics when detecting the pressure applied thereto. Further, another object of the present invention is to substantially eliminate adverse effect of thermal stress in the pressure detecting apparatus.

According to the present invention, a pressure detecting apparatus has a diaphragm to which pressure is applied and a silicon substrate provided on the diaphragm. The silicon substrate has a thin portion which is displaced in response to the displacement of the diaphragm. The thin portion has a through hole for determining a direction in which stress occurs. Further, a first and a second diffusion gauges are formed on the thin portion so that resistances of the first and the second diffusion gauges change in a positive and a negative directions, respectively, in response to the stress occurring at the thin portion.

When the pressure is applied to the diaphragm, tensile stress occurs at the thin portion, so that the resistances of the first and the second diffusion gauges change. Although resistances of diffusion gauges in the conventional art shown in FIGS. 15A and 15c change in response to tensile stress and compressive stress, the resistances of the first and the second diffusion gauges in the present invention change in response to only the tensile stress. As a result, the absolute values of the magnitudes of changes in the resistances of the first and the second diffusion gauges can be set to be equal to each other, whereby the linearity of the output characteristics of the pressure detecting apparatus can be improved.

Further, because the thin portion has the through hole to determine a direction of the stress occurring at the thin portion, it becomes easy to provide the first and the second diffusion gauges on the thin portion so that each resistance thereof changes in the opposite direction each other.

Preferably, the silicon substrate has a {100} face, and the first and the second diffusion gauges are formed on the {100} silicon substrate so that each main current thereof flows in the <110> direction of the silicon substrate. As a result, rates of changes in the resistance of the first and the second diffusion gauges become maximum, respectively, whereby the sensitivity of the pressure detecting apparatus is improved.

Preferably, the pressure detecting apparatus has diffusion leads formed on the thin portion so as to connect to the diffusion gauges. Main current of each diffusion lead substantially flows in the <100> direction of the silicon substrate. In this case, because the piezoresistance effect on the {100} silicon substrate is minimum in the <100> direction, the change in the resistance of each diffusion lead becomes small, whereby the linearity of the output characteristics is further improved.

More preferably, each diffusion lead has a square shape so that the resistance thereof becomes small, whereby the sensitivity of the pressure detecting apparatus is improved.

Other objects and features of the present invention will become more readily apparent from a better understanding of the preferred embodiments described below with reference to the following drawings.

BRIEF DESCRIPTION OF THE DRAWINGS

FIG. 15A is a cross-sectional perspective view showing a sensing body and a strain gauge plate of a pressure detecting apparatus according to a prior art;

FIG. 15B is a graph showing a relationship between stress and a position of the strain gauge plate;

FIG. 15C is a cross-sectional perspective view showing sensing body and a strain gauge plate of a pressure detecting apparatus according to a prior art; and FIG. 15D is a graph showing a relationship between stress and a position of the strain gauge plate.

DETAILED DESCRIPTION OF THE PREFERRED EMBODIMENTS

Embodiments according to the present invention will be described hereinunder with reference to the drawings.

A pressure detecting apparatus in a first embodiment detects pressure of fuel in a high pressure fuel injection apparatus, or of high pressure (10–200 MPa) fluid such as brake fluid, or the like.

Figure 1:
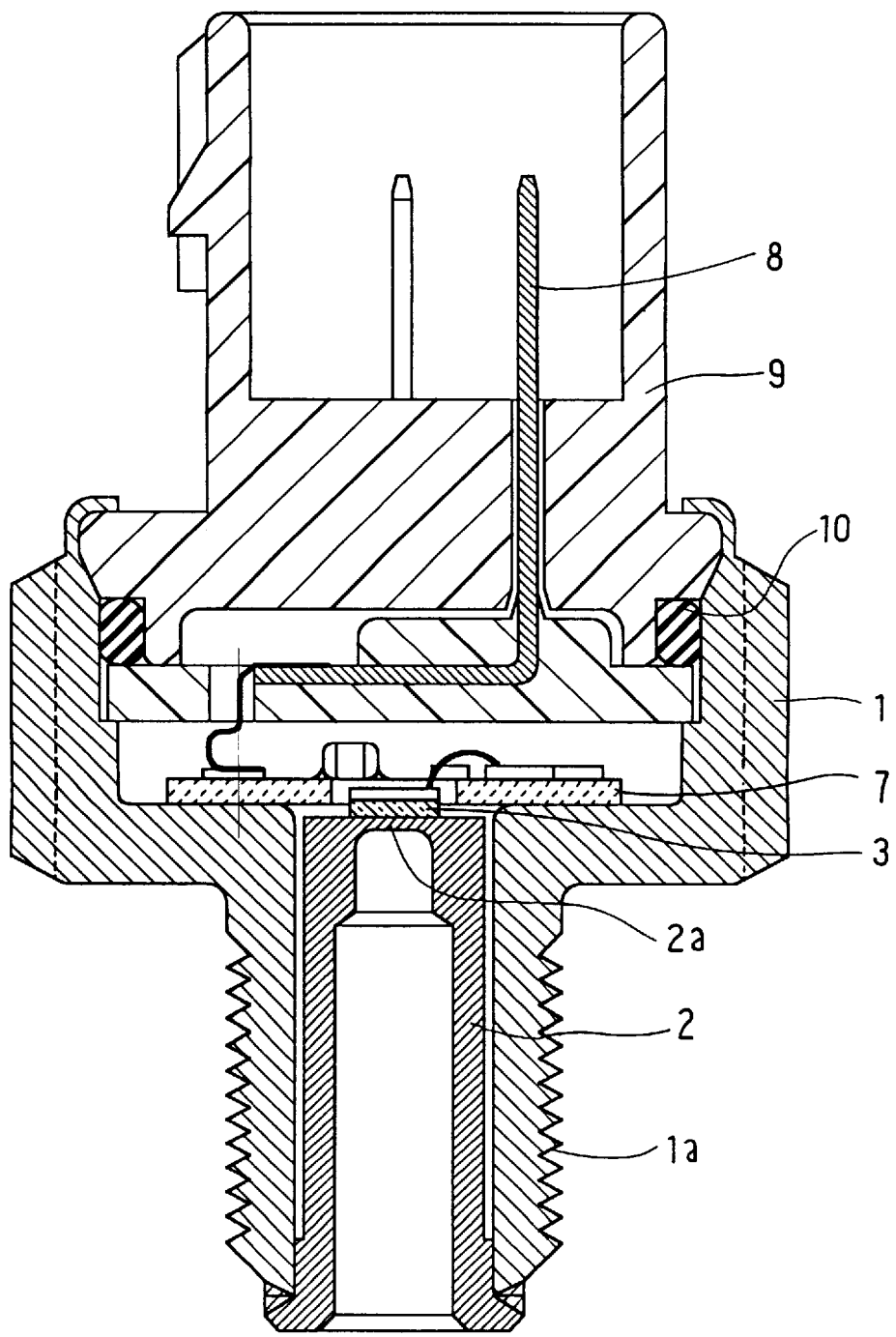
FIG. 1 is a cross-sectional view showing a pressure detecting apparatus in a first embodiment according to the present invention.

As shown in FIG. 1, the pressure detecting apparatus has a metallic housing 1 and a cylindrical sensing body 2 inserted into the housing 1 and fixed at an opening end of the housing 1 by welding. The sensing body 2 is made of metal having low thermal expansion coefficient (covar, 42-alloy, or the like, the thermal expansion coefficient of which is close to that of silicon). A thin diaphragm 2a for receiving pressure is formed at the center of an upper face of the sensing body 2.

On the upper face of the diaphragm 2a is bonded a strain gauge plate 3 through a glass layer, or by utilizing a hard adhesive or the like. The strain gauge plate 3 has diffusion gauges for detecting the pressure applied to the diaphragm 2a.

A ring-shaped ceramic substrate 7 having an amplification circuit for amplifying an electric signal from the strain gauge plate 3 is disposed on the top of the housing 1 so as to surround the strain gauge plate 3. The electric signal amplified by the amplification circuit is output to the outside of the pressure detecting apparatus through a connector pin 8. The amplification circuit may be formed on the strain gauge plate 3.

A connector 9 made of resin is fixed to the housing 1 through an O-shaped ring 10 by caulking. The housing 1 has a threaded portion 1a, which is to be fixed by screwing to a pressure measurement portion of a measurement object.

Figure 2:
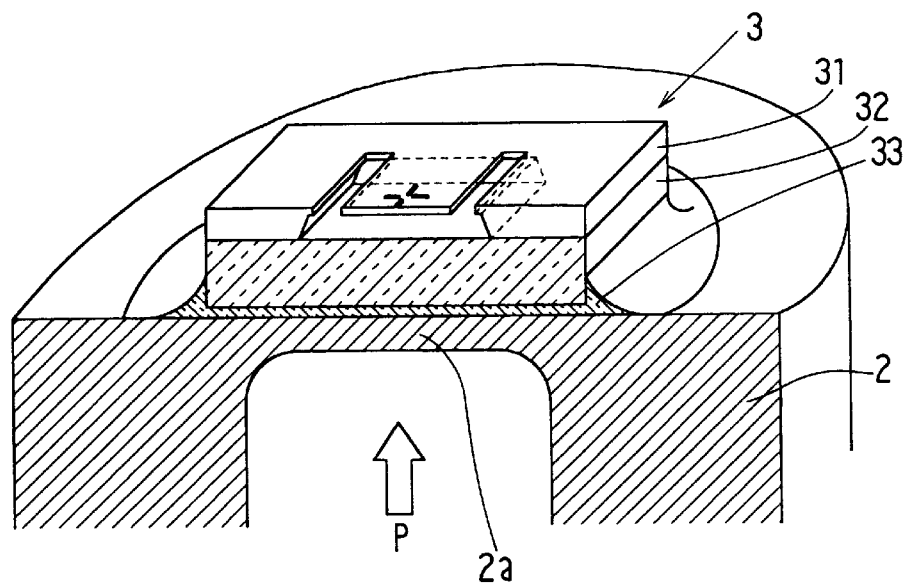
FIG. 2 is a fragmentary cross-sectional perspective view showing a sensing body and a strain gauge plate of the pressure detecting apparatus in the first embodiment.

FIG. 2 shows the sensing body 2 and the strain gauge plate 3 in cross-section perspectively. The strain gauge plate 3 includes a silicon substrate 31 and a glass base 32. The silicon substrate 31 is to be bonded by anode joining to the glass base 31 which is bonded on the diaphragm 2a through a glass layer 33 having a low melting point.

Figure 3A:
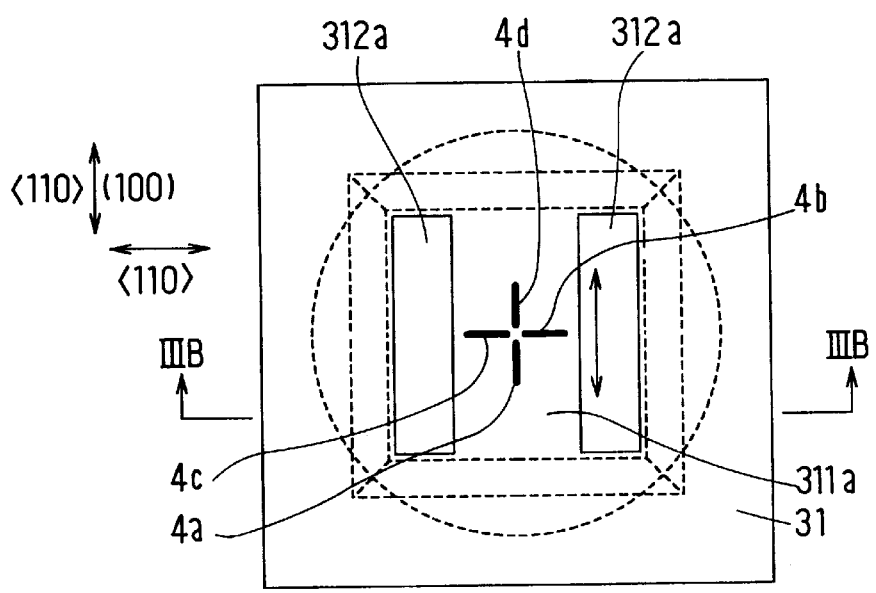
FIG. 3A is a plane view showing a silicon substrate of the strain gauge plate in the first embodiment.
Figure 3B:
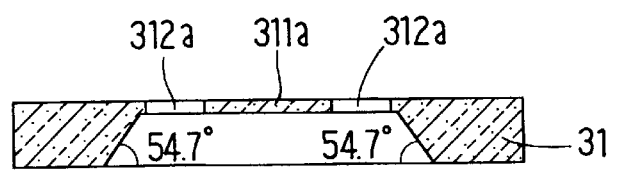
FIG. 3B is a cross-sectional view taken along a IIIB—IIIB line in FIG. 3A, showing the silicon substrate in the first embodiment.

The silicon substrate 31 is an n-type or a p-type {100} semiconductor substrate (n-type in the embodiment) as shown in FIGS. 3A and 3B. The thickness of the silicon substrate 31 is approximately in the range of 0.2 mm–0.6 mm, and the area thereof is approximately in the range of 2 mm²–5 mm².

The silicon substrate 31 is etched from its back side to form a thin portion 311a (for example, the thickness of which is approximately 15–100 $\mu$m) by an anisotropic etching using a potassium hydroxide (KOH) based etching solution. The side face of the silicon substrate 31 formed by the etching approximately makes an angle of 54.7° with the base of the silicon substrate 31 as shown in FIG. 3B.

Through holes 312a are formed on the right and the left sides of the thin portion 311a so that the thin portion 311a has a beam structure. When the diaphragm 2a is displaced, the beam structure determines the direction of the tensile stress generated in the thin portion 311a. That is, when pressure is applied to the diaphragm 2a (a circular portion indicated by a broken line in FIG. 3A) of the sensing body 2, the diaphragm 2a is so bent as to transmit the stress to the silicon substrate 31 through the glass base 32, whereby the tensile stress generates on the entire surface of the strain gauge plate 3. In this case, because the strain gauge plate 31 has through holes 312a, the stress in the longitudinal direction becomes large and predominant compared to the stress in the lateral direction on the surface of the thin portion 311a.

Figure 4:
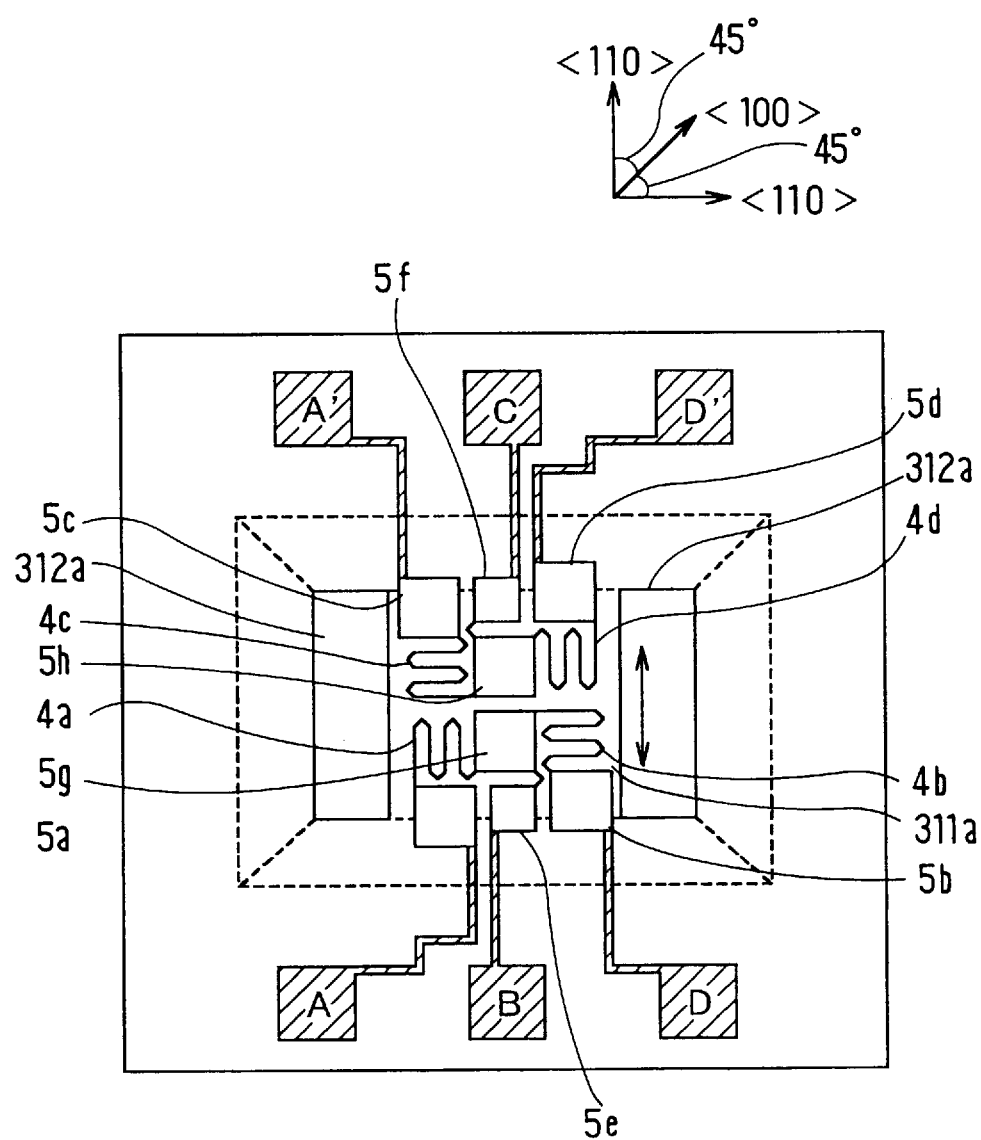
FIG. 4 is a plane view showing diffusion gauges and diffusion leads formed on the silicon substrate in the first embodiment.

Further, as shown in FIG. 4, p-type diffusion gauges 4a to 4d and diffusion leads 5a to 5h are formed on the surface of the silicon substrate 31 by diffusing an impurity. It is not necessary that the impurity concentration in the diffusion gauges 4a to 4d is equal to that in the diffusion leads 5a to 5h. The parts hatched in FIG. 4 are aluminum leads.

The longitudinal direction, that is, the direction in which a main current flows (hereinafter called a current direction), of the diffusion gauges 4a and 4d is parallel to the longitudinal direction (indicated by an arrow in FIG. 4) of the thin portion 311a. On the other hand, the current direction of the diffusion gauges 4b and 4c is parallel to the lateral direction of the thin portion 311a.

Figure 5:
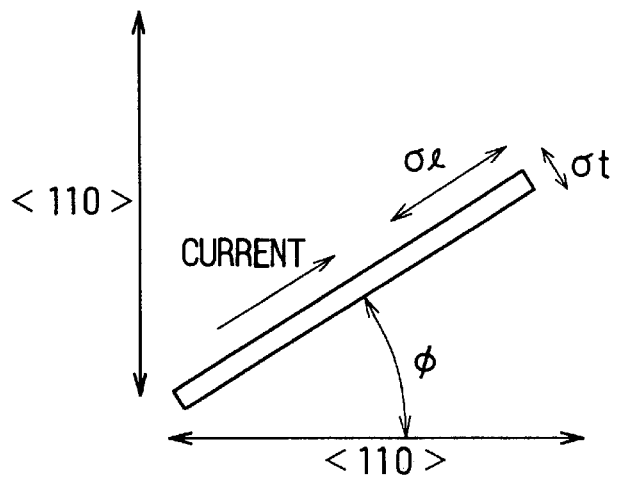
FIG. 5 is an explanatory view for explaining generation of stress with respect to a current direction when a diffusion gauge is formed on a {100} silicon substrate.

When a strip-shaped diffusion gauge is disposed on a {100} silicon substrate as shown in FIG. 5, a rate of change in resistance $\Delta\rho/\rho$ caused by piezoresistance effect is expressed by the following formula (1).

$$\Delta\rho/\rho = \pi_l\sigma_l + \pi_t\sigma_t + \pi_{lt}\sigma_{lt} + \pi_n\sigma_n \quad (1)$$

wherein $\sigma_l$ is a stress in the current direction (the longitudinal direction of the diffusion gauge), $\sigma_t$ is a stress on the {100} face in a direction perpendicular to $\sigma_l$, $\sigma_{Lt}$ is a shearing stress on the {100} face, and $\sigma_n$ is a stress in the normal direction of the {100} face.

Further, $\pi_l$, $\pi_t$, $\pi_{lt}$, and $\pi_n$ are expressed by the following formulas (2).

$$\pi_l = \pi_{l1} - 2(\pi_{11} - \pi_{12} - \pi_{44}) \cdot \cos^2(\phi+45°) \cdot \sin^2(\phi+45°) \quad \pi_t = \pi_{12} - 2(\pi_{11} - \pi_{12} - \pi_{44}) \cdot \cos^2(\phi+45°) \cdot \sin^2(\phi+45°) \quad \pi_{lt} = 2(\pi_{11} - \pi_{12} - \pi_{44}) \cdot \cos(\phi+45°) \cdot \sin(\phi+45°) \cdot \{-\cos^2(\phi+45°) + \sin^2(\phi+45°)\} \pi_n = \pi_{l2} \quad (2)$$

wherein $\phi$ is an angle between the <110> direction of the silicon substrate 31 and the current direction, and $\pi_{11}$, $\pi_{12}$, and $\pi_{44}$ are coefficients for representing the piezoresistance effect, which changes in response to the conducting type of the diffusion gauge and the impurity concentration therein.

When the diffusion gauge is P type, $\pi_{11}$, $\pi_{12}$, $\pi_{44}$ have the following relationship; $\pi_{44} \gg \pi_{11}$, $\pi_{12}$. Therefore, $\Delta\rho/\rho$ can be expressed by the following formula (3) by omitting $\pi_{11}$ and $\pi_{12}$ from the formulas (1) and (2).

$$\Delta\rho/\rho = 2\pi_{44} \cdot \cos^2(\phi+45°) \cdot \sin^2(\phi+45°) \cdot (\sigma_l - \sigma_t) - 2\pi_{44} \cdot \cos(\phi+45°) \cdot \sin(\phi+45°) \cdot \{-\cos^2(\phi+45°) + \sin^2(\phi+45°)\} \cdot \sigma_{lt} \quad (3)$$

According to the formula (3), when $\phi$ is 0°, 90°, 180°, or 270° (that is, when the current direction is parallel to the <110> direction, $\Delta\rho/\rho$ is maximum and expressed by the following formula (4).

$$\Delta\rho/\rho = \pi_{44}(\sigma_l - \sigma_t)/2 \quad (4)$$

When $\phi$ is 45°, 135°, 225°, or 315° (that is, when the current direction is parallel to the <100> direction), $\Delta\rho/\rho$ is minimum and expressed by the following formula (5).

$$\Delta\rho/\rho = 0 \quad (5)$$

Therefore, when the diffusion gauges 4a to 4d are disposed so that each current direction of the diffusion gauges 4a to 4d is parallel to the <110> direction, the rate of change in the resistance caused by the piezoresistance effect $\Delta\rho/\rho$ can get its maximum value.

As mentioned above, the tensile stress occurs on the thin portion 311a in the direction indicated by an arrow in FIG. 4. The main currents of the diffusion gauges 4a and 4d flow in the stress direction in which the tensile stress occurs, respectively. Therefore, $\sigma_l$ is larger than $\sigma_t$, whereby each resistance change rate of the diffusion gauges 4a and 4d gets a positive value according to the formula (4). As opposed to this, because the main currents of the diffusion gauges 4b and 4c flow in the direction perpendicular to the stress direction respectively, $\sigma_l$ is smaller than $\sigma_t$. Therefore, each resistance change rate of the diffusion gauges 4b and 4c gets a negative value. As a result, when the stress occurs, the resistances of the diffusion gauges 4a and 4d increase, while the resistances of the diffusion gauges 4b and 4c decrease.

Figure 6:
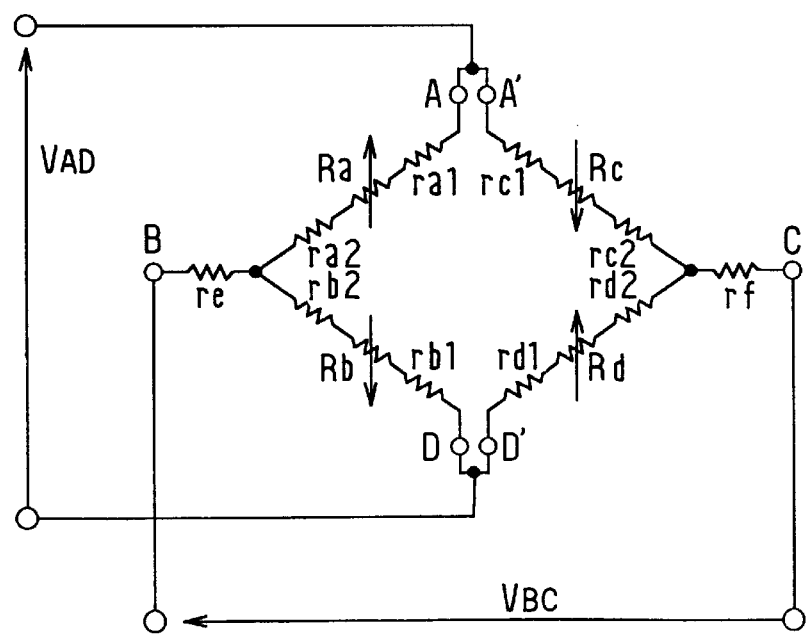
FIG. 6 is an electric connection view showing a Wheatstone bridge circuit composed of the diffusion gauges.

The diffusion gauges 4a to 4d form a Wheatstone bridge circuit shown in FIG. 6 to generate an output voltage $V_{BC}$ in response to the pressure applied to the diaphragm 2a. The output voltage $V_{BC}$ of the Wheatstone bridge can be expressed by the following formula (6) in the case that resistances re and rf of the diffusion leads 5e and 5f are very small enough to be ignored.

$$V_{BC} = (Rb' \cdot Rc' - Ra' \cdot Rd') \cdot V_{AD}/(Ra' + Rb') \cdot (Rc' + Rd') \quad (6)$$

Further, Ra', Rb', Rc' and Rd' are expressed by the following formulas.

$$Ra' = Ra + ra_1 + ra_2$$

$$Rb' = Rb + rb_1 + rb_2$$

$$Rc' = Rc + rc_1 + rc_2$$

$$Rd' = Rd + rd_1 + rd_2$$

wherein Ra to Rd are resistances of the diffusion gauges 4a to 4d, respectively, and $ra_1$ to $rd_1$ are resistances of the diffusion leads 5a to 5d, respectively. Further, $ra_2$ is a resistance of a portion where the diffusion lead 5g is connected to the diffusion gauge 4a, $rb_2$ is a resistance of a portion where the diffusion lead 5g is connected to the diffusion gauge 4b, $rc_2$ is a resistance of a portion where the diffusion lead 5h is connected to the diffusion gauge 4c, and $rd_2$ is a resistance of a portion where the diffusion lead 5h is connected to the diffusion gauge 4d.

In the case that Ra' to Rd' are set to be R, respectively, when pressure is not applied to the diaphragm 2a, it is assumed that amounts of change of Ra' to Rd' in response to the change in pressure are $\Delta Ra'$, $\Delta Rd'$, $-\Delta Rb'$, $-\Delta Rc'$, respectively. All of $\Delta Ra'$, $\Delta Rd'$, $\Delta Rb'$, and $\Delta Rc'$ are positive values. In this case, $\Delta Ra'$ to $\Delta Rd'$ and R have the following relationship; $\Delta Ra'$ to $\Delta Rd' \ll R$. The output voltage $V_{BC}$ is expressed by the following formula (7).

$$V_{BC} = -(\Delta Ra' + \Delta Rd' + \Delta Rb' + \Delta Rc') \cdot R \cdot V_{AD}/(2R + \Delta Ra' - \Delta Rb') \cdot (2R + \Delta Rd' - \Delta Rc') \quad (7)$$

When $\Delta Ra'$ to $\Delta Rd'$ rectilinearly change with respect to the change in pressure, the numerator of the formula (7) indicates linearity. Therefore, when it is realized that; $\Delta Rb' = \Delta Ra'$ and $\Delta Rc' = \Delta Rd'$, the output voltage $V_{BC}$ has linearity with respect to the change in pressure. Accordingly, the amounts of the changes in the resistances of the diffusion gauges 4a and 4b are also set to be equal to each other and those of the diffusion gauges 4c and 4d are set to be equal to each other, thereby resulting in improvement of the linearity of the output voltage $V_{BC}$.

In the above-mentioned constitution, in the case that the thin portion 311a is formed without having the through holes 312a, the stress occurs in the lateral direction with the same strength as in the longitudinal direction because of the symmetric property of the form. Therefore, the piezoresistance effect is set off, so that the output voltage $V_{BC}$ does not change.

In the embodiment, the through holes 312a are formed to form the thin portion 311a into the beam structure, whereby the direction in which the stress occurs is determined. Further, the direction in which the resistances of the diffusion gauges 4a and 4d change is set to be opposite to the direction in which the resistances of the diffusion gauges 4b and 4c change. As a result, the diffusion gauges can detect the pressure.

Because the diffusion leads 5a to 5h have a square shape, respectively, as shown in FIG. 4, the current flows in the diffusion leads 5a to 5h in the direction where a piezoresistance coefficient becomes minimum, that is, in the <100> direction of the silicon substrate. Accordingly, the changes in the resistances of the diffusion leads 5a to 5d with respect to the stress substantially become zero, resulting in improvement of the linearity of the output voltage $V_{BC}$.

Only if the current flows within the diffusion leads 5a to 5h in the <100> direction, the linearity of the output voltage $V_{BC}$ is improved. Therefore, shapes of diffusion leads 5a to 5h are not limited to the square shape, and it may be the other shape. For example, a strip-shape elongating in parallel with the <100> direction of the silicon substrate may be adopted. The diffusion lead of the square shape, however, has small resistance compared with the diffusion lead of the strip-shape. Therefore, the voltage applied to the diffusion gauges through the diffusion lead having the square shape becomes large. As a result, the sensitivity of the sensor can be improved. To improve the linearity of the output voltage $V_{BC}$, it is not necessary that the current flows exactly in the <100> direction in the diffusion leads. It is acceptable for the current to flow substantially in the <100> direction.

In the view that the current flows in the <100> direction in the diffusion leads, the diffusion leads arranged in this way may be adopted not only in the pressure sensor for detecting high pressure but in a pressure sensor for detecting low pressure or in an acceleration sensor with a beam formed on a {100} silicon substrate. Accordingly, the linearity of output voltage of the sensor can be improved.

Next, other embodiments having a thin portion of a different shape from that in the first embodiment will be described.

Figure 7:
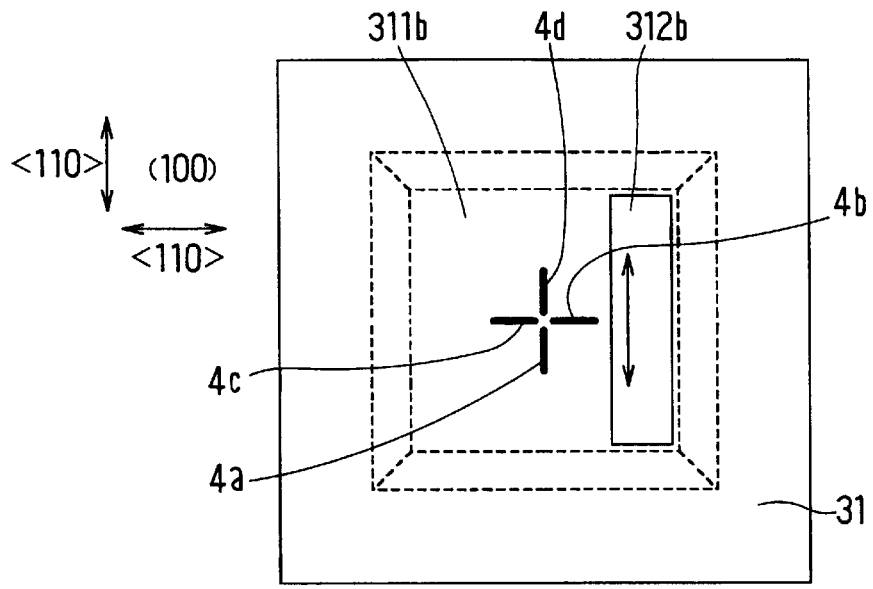
FIG. 7 is a plane view showing a silicon substrate of a strain gauge plate having a thin portion and a through hole in a modified embodiment.

Although the thin portion 311a is formed so as to have two through holes 312a in the first embodiment, a thin portion 311b may be formed so as to have only one through hole 312b as shown in FIG. 7. In this case, the stress at the thin portion 311b is predominant in the longitudinal direction along the through hole 312b at the portion adjacent to the through hole 312b. The longer the distance to the through hole 312b becomes at the thin portion 311b, the larger the stress in the lateral direction becomes. Therefore, the diffusion gauges 4a to 4d are formed as adjacently to the through hole 312b as possible.

Figure 8:
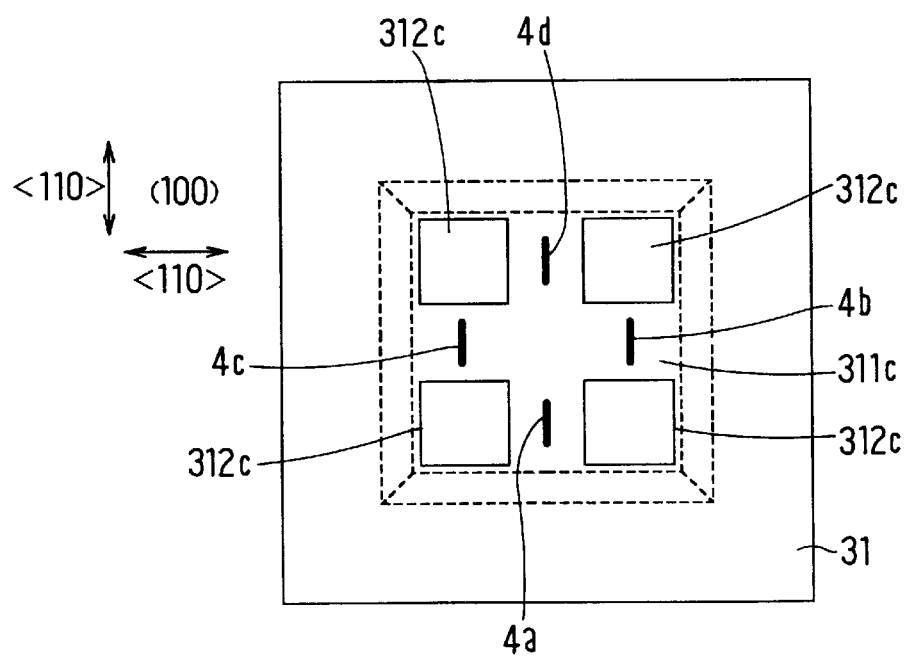
FIG. 8 is a plane view showing a silicon substrate of a strain gauge plate having a thin portion and four through holes in a modified embodiment.

Further, as shown in FIG. 8, a thin portion 311c may be formed so as to have four through holes 312c. In this case, the stress occurs not only in the longitudinal direction but also in the lateral direction. In this constitution, when the diffusion gauges are disposed in the same arrangement as the first embodiment shown in FIG. 4, because each resistance of the diffusion gauges changes in the same direction from each other, the pressure can not be detected. Therefore, each diffusion gauge is formed on each beams, respectively, so that each longitudinal direction of the diffusion gauges is parallel to each other. As a result, the resistances of the diffusion gauges 4a and 4d change in the opposite direction to the direction in which the resistances of the diffusion gauges is 4b and 4c change, whereby the pressure can be detected.

In the embodiment shown in FIG. 7, because the thin portion 311b is supported at three sides, the thin portion 311b does not bend easily compared with the thin portion 311a in the first embodiment which is supported at only two sides as shown in FIG. 3. Therefore, the sensitivity of the thin portion 311b is inferior to that in the first embodiment.

Further, in the other embodiment shown in FIG. 8, because the diffusion gauges 4a to 4d are formed on the beams dispersively, it is difficult to connect wiring to each diffusion gauge. Further, if the accuracy processing the four through holes 312c is not sufficient, the sensitivity is lowered. Therefore, the sensitivity of the thin portion 311a having the two through holes 312a in the first embodiment is the best in the above mentioned three embodiments.

Figure 9:
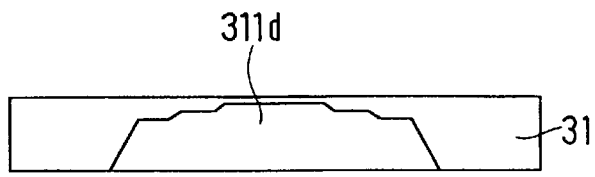
FIG. 9 is a cross-sectional view showing a silicon substrate of a strain gauge plate having a thin portion in a modified embodiment.

As shown in FIG. 9, in the case that a thin portion 311d is formed in the center being thinner than the periphery, the sensitivity with respect to the change in pressure can be improved.

In the present invention, it is not necessary that the silicon substrate 31 is bonded on the glass base 32. The silicon substrate 31 may be directly bonded on the sensing body 2 without the glass base 32 interposed therebetween.

Figure 10:
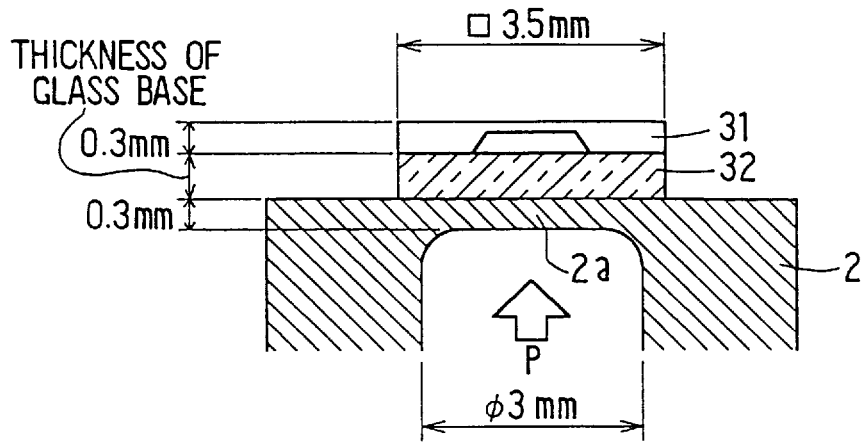
FIG. 10 is a cross-sectional view showing a sensing body and a strain gauge plate used in experiments to obtain a relationship in FIG. 11.

Next, thermal stress caused by a difference in thermal expansion coefficient between the sensing body 2 and the strain gauge plate 3 will be explained. The inventors studied the relationship between the magnitude of the stress (thermal output) generated on the surface at the center of the strain gauge plate 3 and the thickness of the glass base 32, in a state that the strain gauge plate 3 was heated ($\Delta T=100°$ C.). The thickness of the silicon substrate 31 and the thickness of the diaphragm 2a were 0.3 mm, respectively, as shown in FIG. 10.

Figure 11:
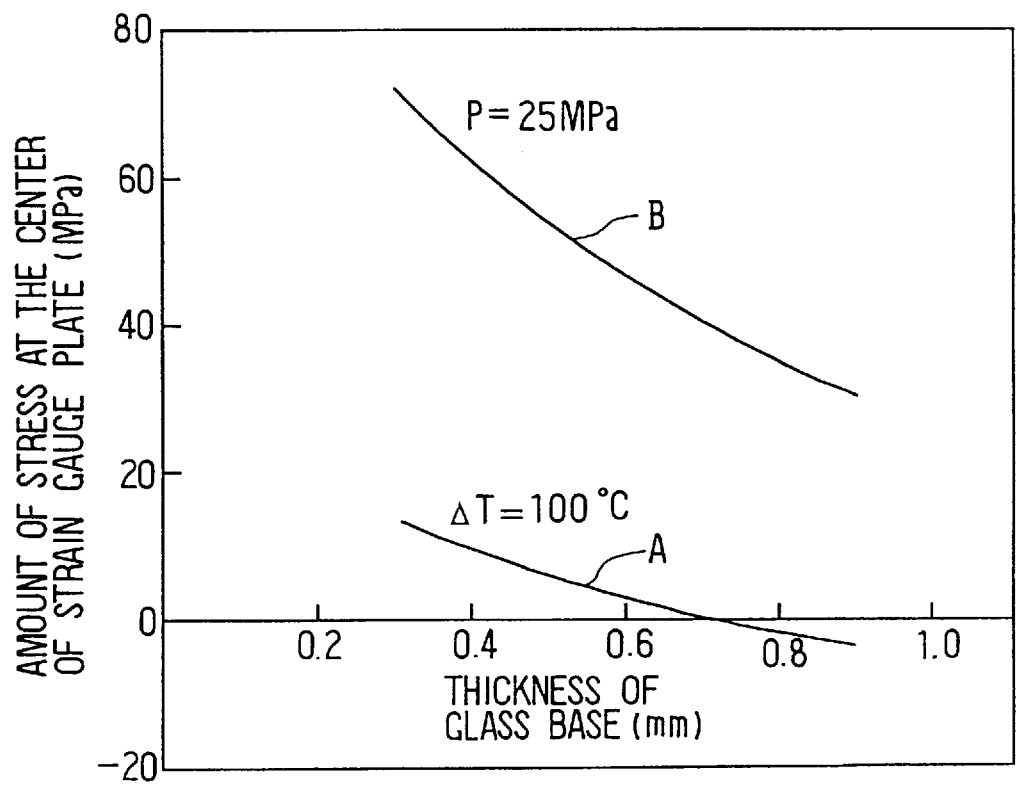
FIG. 11 is a graph showing a relationship between a magnitude of stress generated at the center of the strain gauge plate and a thickness of a glass base.

The result of the experiments is indicated in FIG. 11. Conventionally, it has been considered that the thermal output occurs even if the thickness of the glass base 32 is sufficiently thick. As indicated by a curved line A in FIG. 11, however, it was founded that there was a specific thickness of the glass base in which the thermal output became zero. In the case that the thickness of the glass base 32 is thinner than the specific thickness, the tensile stress is generated on the surface of the strain gauge plate 3 in response to the tensile stress generated on the diaphragm 2. In the case that the thickness of the glass base 32 is thicker than the specific thickness, the compressive stress is generated on the surface of the strain gauge plate 3 instead of the tensile stress. That is, the deformation mode of the strain gauge plate 3 changes on the basis of the thickness of the glass base 2.

The thicker the thickness of the glass base 32 becomes, the lower the sensitivity becomes as indicated by a curved line B in FIG. 11. However, when the thermal output which causes noise becomes zero the S/N ratio can be improved.

When the temperature of the strain gauge plate 3 and the sensing body 2 varies, the pattern of the curved line A changes, however, the thickness of the glass base 32 in which the thermal output becomes zero does not change. When the size of the silicon substrate 31 is changed, the curved line A moves in the left or the right direction in FIG. 11. Therefore, it is necessary that the ratio of the size of the silicon substrate 31 and the thickness of the glass base 32 are chosen appropriately so that the thermal output becomes zero.

Figure 12:
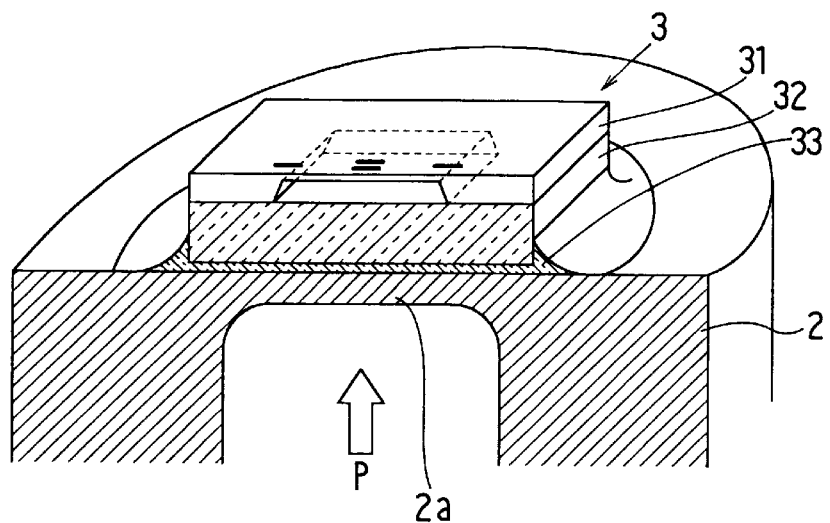
FIG. 12 is a fragmentary cross-sectional perspective view showing a sensing body and a strain gauge plate in the other embodiment.
Figure 13:
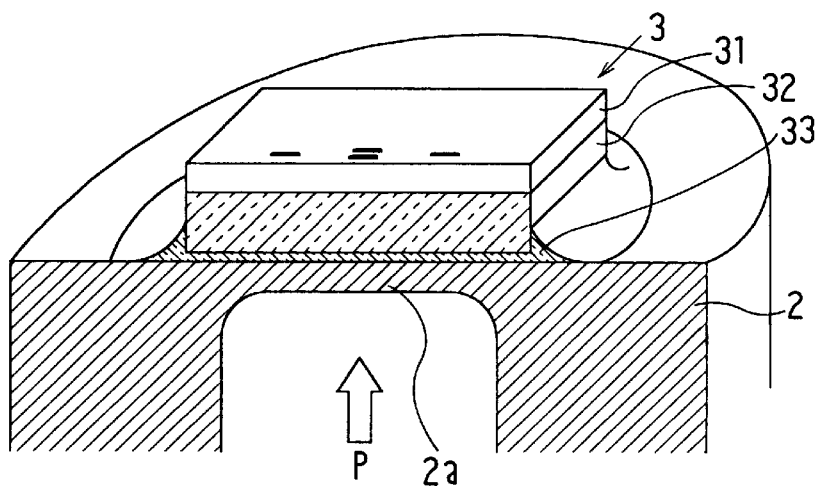
FIG. 13 is a fragmentary cross-sectional perspective view showing a sensing body and a strain gauge plate in the other embodiment.
Figure 14:
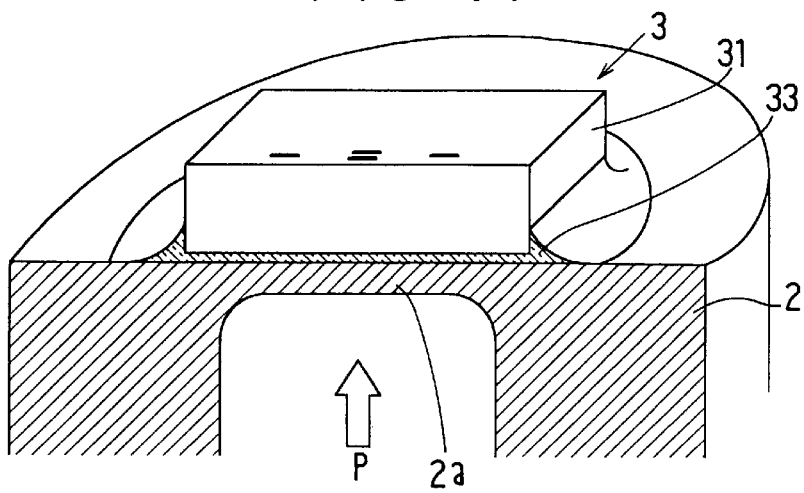
FIG. 14 is a fragmentary cross-sectional perspective view showing a sensing body and a strain gauge plate in the other embodiment.

To make the thermal output zero, as shown in FIGS. 12 and 13, a {110} silicon substrate without a thin portion as well as with the thin portion can be adopted to a pressure detecting apparatus. Further, as shown in FIG. 14, the {110} silicon substrate 31 without the thin portion may be directly bonded on the strain gauge plate 3 without the glass base 32.

In the above mentioned embodiments, the diffusion gauges 4a to 4d and the diffusion leads 5a to 5h may be n-type instead of p-type.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A pressure detecting apparatus comprising:
a diaphragm which is displaced in response to pressure applied thereto;
a silicon substrate provided on the diaphragm, said substrate having a thin portion which is displaced in response to the displacement of the diaphragm in order to generate stress therein, the thin portion having a through hole for determining a stress direction in which the stress occurs;
a first diffusion gauge disposed on the thin portion, a longitudinal direction of said first diffusion gauge being parallel to the stress direction so that a resistance of the first diffusion gauge changes in a positive direction in response to the stress; and
a second diffusion gauge disposed on the thin portion, a longitudinal direction of said second diffusion gauge being perpendicular to the stress direction so that a resistance of the second diffusion gauge changes in a negative direction in response to the same stress as imparted to the first diffusion gauge, wherein,
the pressure applied to the diaphragm is detected based on the resistances of the first and the second diffusion gauges.

2. A pressure detecting apparatus according to claim 1, a magnitude of change in the resistance of the first diffusion gauge is approximately equal to that of the second diffusion gauge.

3. A pressure detecting apparatus according to claim 1, further comprising diffusion leads connected with the first and the second diffusion gauges, respectively, for outputting an output value from the first and the second diffusion gauges, wherein,
the silicon substrate has {100} crystal orientation, and
main current of each of the diffusion leads flows in the <100> direction of the silicon substrate.

4. A pressure detecting apparatus according to claim 3 wherein the diffusion leads have a square-shape.

5. A pressure detecting apparatus according to claim 1, wherein:
the silicon substrate has {100} crystal orientation; and
main current of each of the first and the second diffusion gauges flows in the <110> direction of the silicon substrate.

6. A pressure detecting apparatus according to claim 1, wherein the thin portion has a beam structure, and the stress mainly occurs in a longitudinal direction of the thin portion.

7. A pressure detecting apparatus according to claim 6, wherein the through hole has a first and a second through holes so that the thin portion is formed therebetween.

8. A pressure detecting apparatus according to claim 6, wherein the silicon substrate has {100} crystal orientation, and the longitudinal direction of the thin portion is parallel to the <110> direction of the silicon substrate.

9. A pressure detecting apparatus comprising:
a diaphragm which is displaced in response to pressure applied thereto;
a silicon substrate provided on the diaphragm and having a thin portion which is displaced in response to the displacement of the diaphragm to generate stress, the thin portion having a through hole and being formed in a beam structure having a longitudinal direction in which the stress mainly occurs;
a first diffusion gauge formed on the thin portion, a main current thereof flowing in the longitudinal direction of the thin portion, and a resistance thereof changing in a positive direction in response to the stress; and
a second diffusion gauge formed on the thin portion, a main current thereof flowing in a direction perpendicular to the longitudinal direction of the thin portion, and a resistance thereof changing in a negative direction in response to the stress.

10. A pressure detecting apparatus comprising:
a diaphragm which is displaced in response to pressure applied thereto;
a substrate provided on the diaphragm and having a thin portion which is displaced in response to the displacement of the diaphragm to generate stress therein, the thin portion having a through hole for determining a direction in which the stress occurs, and being formed in a cross-shape with four beams; and
first and second diffusion gauges formed on the beams respectively, so that main current of each of the first and second diffusion gauges flows in parallel to each other,
wherein a resistance of the first diffusion gauge changes in a positive direction in response to the stress; and
a resistance of the second diffusion gauge changes in a negative direction in response to the stress.

11. A pressure detecting apparatus according to claim 10, wherein the first and the second diffusion gauges are formed so that main current of each of the diffusion gauges flows in parallel to the <110> direction of the silicon substrate.

12. A pressure detecting apparatus according to claim 1, wherein the thin portion has a beam structure, and the first and second diffusion gauges are perpendicular to each other.

13. A pressure detecting apparatus according to claim 1, wherein the thin portion has a cross-shape and the first and second diffusion gauges are parallel to each other.

14. A pressure detecting apparatus according to claim 9, wherein the silicon substrate has {100} crystal orientation, and the longitudinal direction of the thin portion is parallel to the <100> direction of the silicon substrate.

15. A pressure detecting apparatus according to claim 9, wherein the stress is tensile stress.

16. A pressure detecting apparatus according to claim 15, wherein a central portion of the thin portion is thinner than a peripheral portion thereof, and the first and second diffusion gauges are formed on the central portion of the thin portion.

17. A pressure detecting apparatus comprising:
a diaphragm which is displaced in response to pressure applied thereto;
a base disposed on the diaphragm;
a substrate disposed on the base and having a thin portion formed at a central portion thereof so that a gap is formed between the base and the substrate;
a through hole formed in the thin portion for determining a stress direction in which stress occurs in the thin portion when the thin portion is displaced in response to the displacement of the diaphragm transmitted via the base and a portion of the substrate surrounding the thin portion; and
a gauge provided on the thin portion, the gauge changing a resistance thereof in response to the stress of which a direction is determined by the through hole.

18. A pressure detecting apparatus according to claim 17, wherein:
the gauge includes first and second gauges;

a resistance of the first gauge increases in response to a change of the stress; and a resistance of the second gauge decreases in response to the change of the stress.

19. A pressure detecting apparatus according to claim 18, wherein:

the thin portion has a beam shape by the through hole;

the first gauge is disposed to be parallel to a longitudinal direction of the thin portion; and the second gauge is disposed to be perpendicular to the longitudinal direction of the thin portion.

20. A pressure detecting apparatus according to claim 19, wherein:

the substrate is a {100} crystal orientation silicon substrate; and the longitudinal direction of the thin portion is parallel to the <110> direction of the silicon substrate.

21. A pressure detecting apparatus according to claim 18, wherein:

the thin portion has a cross-shape with four beams; and the first and second gauges are respectively disposed on the beams to be parallel to each other.

22. A pressure detecting apparatus according to claim 21, wherein:

the substrate is a {100} crystal orientation silicon substrate; and the beams of the thin portion are parallel to the <110> direction of the silicon substrate.

* * * * *